US 8,306,015 B2

(12) United States Patent  
Guntur

(10) Patent No.: US 8,306,015 B2
(45) Date of Patent: Nov. 6, 2012

(54) TECHNIQUE FOR IDENTIFYING RTP BASED TRAFFIC IN CORE ROUTING SWITCHES

(75) Inventor: Ravindra Guntur, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1112 days.

(21) Appl. No.: 12/195,448

(22) Filed: Aug. 21, 2008

(65) Prior Publication Data

US 2009/0135834 A1 May 28, 2009

(30) Foreign Application Priority Data

Nov. 22, 2007 (IN) .......................... 2735/CHE/2007

(51) Int. Cl.
*H04L 12/28* (2006.01)

(52) U.S. Cl. ...................................... 370/351

(58) Field of Classification Search .................. 370/351, 370/389, 395.1, 395.5, 395.52, 395.6
See application file for complete search history.

(56) References Cited

U.S. PATENT DOCUMENTS

| 7,860,087 | B2 * | 12/2010 | Kim .............................. 370/389 |
| 2001/0048680 | A1 * | 12/2001 | Yoshimura et al. ........... 370/389 |
| 2004/0037317 | A1 * | 2/2004 | Zalitzky et al. ............... 370/466 |
| 2004/0066789 | A1 * | 4/2004 | Kobayashi .................... 370/402 |
| 2004/0213152 | A1 | 10/2004 | Matuoka et al. |
| 2005/0047422 | A1 | 3/2005 | Chen et al. |
| 2006/0050705 | A1 * | 3/2006 | Kim .............................. 370/392 |
| 2006/0198376 | A1 * | 9/2006 | Takamichi .................... 370/394 |
| 2007/0206594 | A1 * | 9/2007 | Johnson et al. ............... 370/389 |
| 2007/0211719 | A1 * | 9/2007 | Johnson et al. ............... 370/389 |

* cited by examiner

*Primary Examiner* — Fan NG

(57) ABSTRACT

A technique for identifying RTP based traffic in routers and switches is disclosed. In one embodiment, a method of identifying RTP based traffic in routers and switches, includes receiving IP packets including a UDP header and a second header located substantially after the UDP header, generating statistical parameters by inspecting predetermined sequence of bits at predetermined offsets in the second header of each received IP packet for a predetermined number of IP packets, and determining whether the IP packet is an RTP based IP packet by comparing the generated statistical parameters to predetermined characteristics. The method also includes pre-filtering the received IP packets to allow only the IP packets comprising the UDP header and the second header to reach an RTP detection engine.

19 Claims, 3 Drawing Sheets

TECHNIQUE FOR IDENTIFYING RTP BASED TRAFFIC IN CORE ROUTING SWITCHES

BACKGROUND

As IP (Internet Protocol) network equipment, such as routers and switches become more powerful, the need for value-added services on these equipments is increasing. The type of services which may be enabled depends on performance issues, availability of hardware to support meaningful services, and a need for such services. Based on these constraints, one promising feature that can be explored is designing routers and switches which are able to decide on forwarding/switching operations based on content. A typical application space is proactive multimedia delivery and real-time collaborative gaming.

Streamed media applications, such as video-on-demand, broadcast quality Internet television (IPTV), Internet-based telephony (VoIP), collaborative multimedia conferencing (HALO), integrated mail, text and voice chat applications (e.g., Gtalk) are becoming more and more popular and cost effective. Increase in effective throughput of links and better bandwidth handling have given a fillip to the above-mentioned applications. As networks become faster, applications tend to become more and more bandwidth hungry. As a result, there is always a case for better algorithms for QoS (Quality of Service) management.

The most popular transport mechanism for delivery of streamed audio/video content is via RTP (Real-time Transfer Protocol) encapsulated UDP (User Datagram Protocol). Generally, UDP does not guarantee reliable delivery of content unlike TCP (Transmission Control Protocol). This feature is beneficial for real-time audio/video streaming and gaming applications which are generally delay and jitter sensitive. Further, RTP encapsulation allows for multiplexing various sources of content into the same stream. The receiver-end then demultiplexes individual contributor's content and renders each of the contributors' content appropriately. Typically, the transmitter multiplexes audio and video components into the same stream and the decoder demultiplexes each of them based on an identifier, present in the RTP header. Furthermore, most of the broadcast quality IPTV solutions rely on RTP based multicast sessions for media delivery. RTP also allows multiplexing of different bit-rate video, so that, the overall quality of the decoded video can be controlled based on selecting all or a portion of these multiplexed streams.

To enable such value added services for video delivery, it is crucial to detect the presence of RTP based transmissions. Port numbers are not good indicators of whether the UDP stream is carrying RTP based transmissions. Current techniques include inspecting the payload type field following the UDP header to detect the presence of RTP. However, these techniques are not reliable and can lead to false identification of the presence of RTP.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A technique for identifying RTP based traffic in core routing switches is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
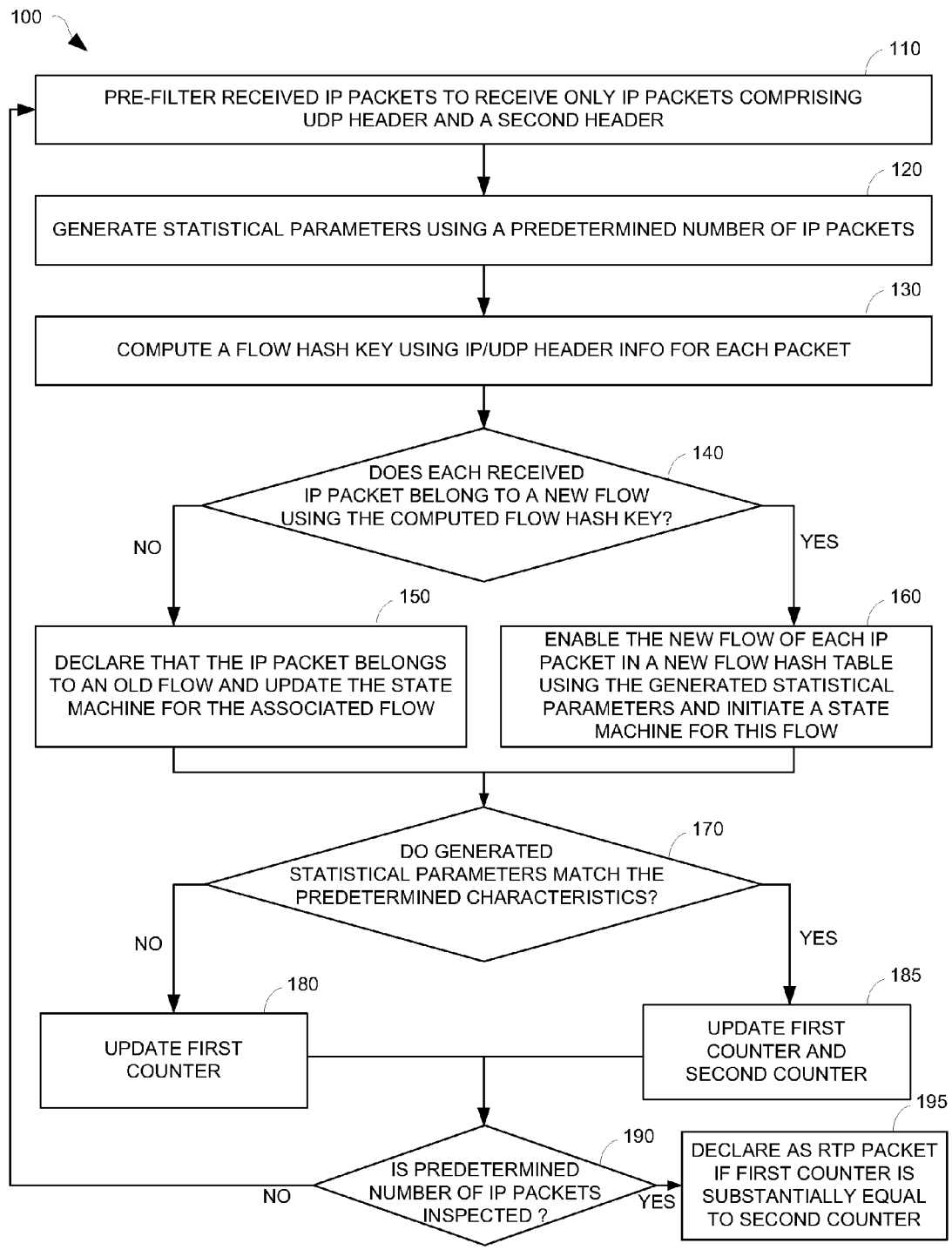
FIG. 1 is a process flow of identifying RTP based traffic in routers and switches in an IP network, according to one embodiment.

FIG. 1 is a process flow 100 of identifying RTP based traffic in routers and switches in an IP network, according to one embodiment. In operation 110, received IP packets are pre-filtered (e.g., through the UDP header parser 220 of FIG. 2) to allow only the IP packets including a UDP header and a second header to reach an RTP detection engine (e.g., the RTP detection engine 250 of FIG. 2). In some embodiments, the received IP packets include a UDP header and a second header located substantially after the UDP header. In these embodiments, the pre-filtering is implemented as a TCAM based match on the IP protocol field. For example, if the IP header of the IP packet is carrying number 17 in the protocol field, the TCAM enables a rule which redirects the IP packet to a line-card capable of deep IP packet inspection.

In operation 120, statistical parameters are generated (e.g., through the RTP detection engine 250 of FIG. 2) using a predetermined number of IP packets. In these embodiments, the statistical parameters are generated by inspecting predetermined sequence of bits at predetermined offsets in the second header of each received IP packet for the predetermined number of packets. The statistical parameters are selected from the group consisting of flow type, time sequence number, time stamp and SSRC in the second header of the received IP packet using bit sequences associated with fields in RTP based IP packet.

In operation 130, a flow hash key is computed (e.g., through the hash engine 230 of FIG. 2) using IP/UDP header information for each packet. In these embodiments, a flow hash key is computed using source IP address and destination IP address present in the IP header, and source port and destination port information present in the UDP header of each IP packet.

In operation 140, the process flow determines whether each received IP packet belongs to a new flow using the computed flow hash key. In these embodiments, the RTP detection engine 250 is used to determine whether the IP packet belongs to the new flow. The process flow is routed to operation 150, if the IP packet does not belong to a new flow. In operation 150, it is declared that the IP packet belongs to an old flow and the associated state machine is updated for the associated flow.

The process flow is routed to operation 160, if the IP packet belongs to a new flow. In operation 160, the new flow of each IP packet is enabled in a new flow hash table by updating a corresponding flow hash table using the generated statistical parameters associated with each IP packet and a state machine is initiated for the new flow. In one embodiment, an entry in the flow hash table has one 8 bit field for payload type, one 16 bit field for sequence number, and two 32 bit fields for timestamp and SSRC in addition to the hash key.

In these embodiments, enabling the new flow of each IP packet in the new flow hash table includes filling an 8 bit field with a content present in a $2^{nd}$ byte following the UDP header, filling a 16 bit field with 16 bits at an offset of 2 bytes following the UDP header, and filling two 32 bit fields with a $2^{nd}$ word and $3^{rd}$ word, respectively, following the UDP header.

In operation 170, the process flow determines whether the generated statistical parameters match the predetermined characteristics. In some embodiments, the generated statistical parameters are compared (e.g., through the RTP detection engine 250 of FIG. 2) to the predetermined characteristics to determine the RTP based IP packets from the received IP packets. If the generated statistical parameters do not match the predetermined characteristics, then a first counter is updated in operation 180. In one embodiment, a corresponding first 8 bit counter is incremented if the IP packet belongs to the old flow.

If the generated statistical parameters match the predetermined characteristics, then both the first counter and a second counter are updated in operation 185. In these embodiments, a corresponding second 8 bit counter is incremented if the following conditions are true.
1. A second byte following the UDP header substantially matches with the 8 bit field.
2. The 16 bits at an offset of 2 bytes from the UDP header is greater than a value present in the 16 bit field.
3. If the second word following the UDP header is greater than the value contained in the first 32 bit field, and
4. If the third word following the UDP header is equal to the second 32 bit field.

In other words, a first counter is incremented by 1, if a packet of the corresponding flow is seen and Counter-2 is incremented if the above-mentioned conditions are satisfied. In operation 190, the process flow determines whether the predetermined number of IP packets is inspected or not. The process flow goes to operation 110 and repeats the steps 120-190, if the predetermined number of IP packets is not inspected. In these embodiments, the steps of incrementing the corresponding first 8 bit counter and incrementing the corresponding second 8 bit counter are repeated for the predetermined number of IP packets. Otherwise, the process flow goes to operation 195, if the predetermined number of IP packets is inspected. In operation 195, the IP packet is declared as an RTP based IP packet if the first 8 bit counter is substantially equal to the second 8 bit counter.

Figure 2:
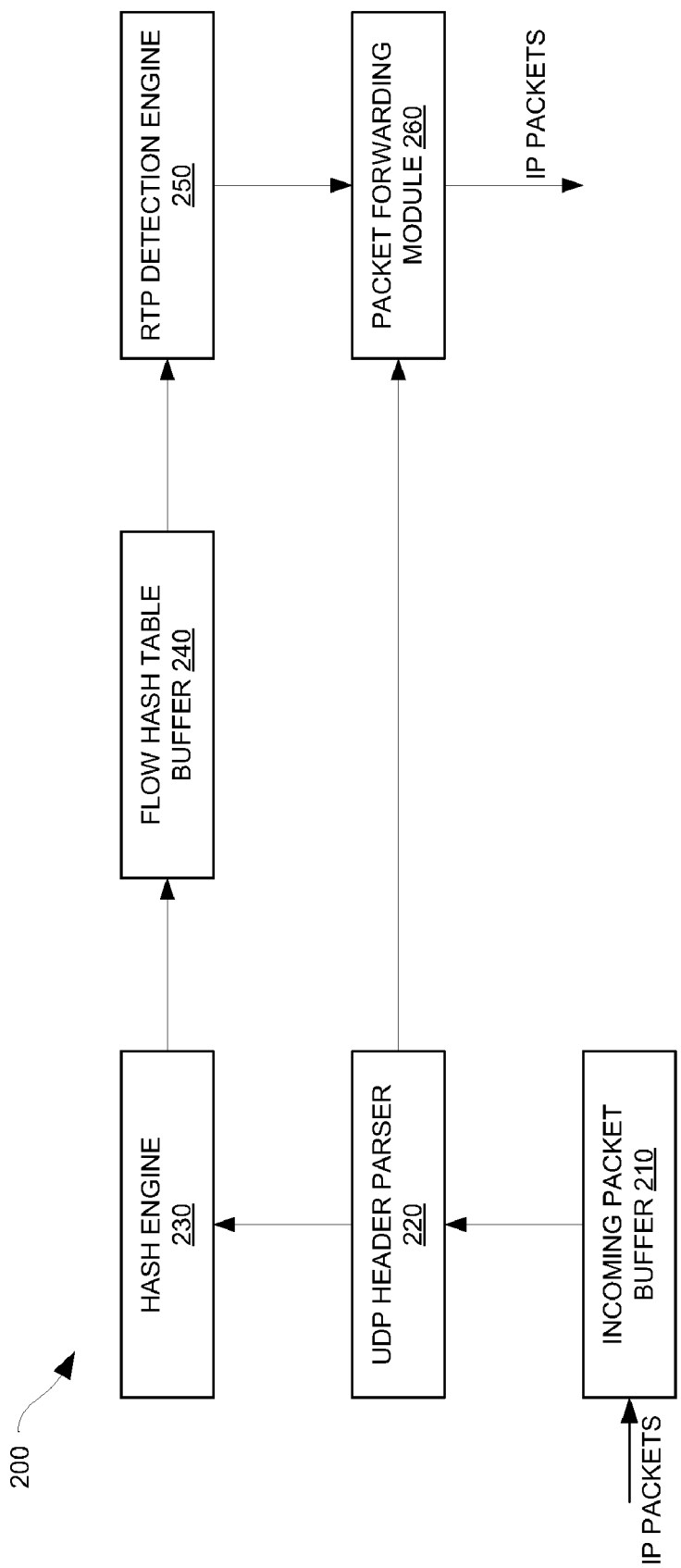
FIG. 2 is a block diagram illustrating a high level architecture of an RTP based traffic identifying device, according to one embodiment.

FIG. 2 is a block diagram 200 illustrating a high level architecture of an RTP based traffic identifying device, according to one embodiment. Particularly, FIG. 2 illustrates an incoming packet buffer 210, an UDP header parser 220, a hash engine 230, a flow hash table buffer 240, an RTP detection engine 250 and a packet forwarding module 260 for identifying RTP based traffic in routers and switches in an IP network.

In operation, the incoming packet buffer 210 is configured to store the received IP packets including a UDP header and a second header located substantially after the UDP header. The incoming packet buffer 210 then transmits the received IP packets to the UDP header parser 220. The UDP header parser 220 is configured to receive the IP packets and to parse the IP packets including the UDP header. In some embodiments, the UDP header parser 220 pre-filters the received IP packets to allow only IP packets including the UDP header and the second header to reach the RTP detection engine 250.

In operation, the hash engine 230 computes a flow hash key using the source IP address, destination IP address, source port and destination port information present in the UDP header of each IP packet. In some embodiments, the RTP detection engine 250 determines whether each received IP packet belongs to a new flow using the computed flow hash key.

In operation, the RTP detection engine 250 generates statistical parameters by inspecting predetermined sequence of bits at predetermined offsets in a second header of each received IP packet including the UDP header for a predetermined number of IP packets. For example, the statistical parameters are selected from the group consisting of flow type, time sequence number, time stamp and SSRC in the second header of the received IP packet, using bit sequences associated with fields in RTP based IP packet.

In some embodiments, if the received IP packet belongs to the old flow, the RTP detection engine 250 declares that the IP packet belongs to an old flow and updates the associated state machine. In operation, the RTP detection engine 250 enables the new flow of each IP packet in a new flow hash table by updating a corresponding flow hash table entry residing in the flow hash table using the generated statistical parameters associated with each IP packet and initiates a state machine for the new flow if the received IP packet belongs to the new flow. In these embodiments, the flow hash table buffer 240 coupled to the hash engine 230 is updated with information associated with each flow referenced by the flow hash key. For example, if the flow ceases, the entry corresponding to each IP packet is removed from the flow hash table.

In one example embodiment, each entry in the flow hash table has one 8 bit field for payload type, one 16 bit field for sequence number, and two 32 bit fields for timestamp and SSRC (i.e., the synchronization source) identifier values, in addition to the hash key. In these embodiments, the RTP detection engine 250 fills an 8 bit field with a content present in a $2^{nd}$ byte following the UDP header, the RTP detection engine 250 fills a 16 bit field with 16 bits at an offset of 2 bytes following the UDP header, and the RTP detection engine 250 fills two 32 bits fields with a $2^{nd}$ word and $3^{rd}$ word, respectively, following the UDP header to enable the new flow of each IP packet in the new flow hash table.

In operation, the RTP detection engine 250 determines whether the IP packet is an RTP based IP packet by comparing the generated statistical parameters to predetermined characteristics. In these embodiments, the RTP detection engine 250 increments corresponding first 8 bit counter if the IP packet belongs to the old flow. The RTP detection engine 250 increments a corresponding second 8 bit counter if a second byte following the UDP header matches with the 8 bit field, if the 16 bits at an offset of 2 bytes from the UDP header is greater than a value present in the 16 bit field, if the second word following the UDP header is greater than the value contained in the first 32 bit field, and if the third word following the UDP header is equal to the second 32 bit field.

Further, the RTP detection engine 250 repeats the steps of incrementing the corresponding first 8 bit counter and incrementing the corresponding second 8 bit counter for the predetermined number of IP packets. The RTP detection engine 250 declares the IP packet as an RTP based IP packet if the first 8 bit counter is substantially equal to the second 8 bit counter. In operation, the packet forwarding module 260 serves as a repository to collect the RTP based IP packets from the RTP detection engine 250 and the UDP header parser 220 and further transmits the IP packets for a number of applications such as billing and accounting, assignment of diff-serv code points to streams and assigning different MPLS/Q-in-Q tags to multimedia streams.

For example, consider the predetermined number of IP packets as 10. Therefore, the 10 packets are inspected using the above-mentioned procedure. Once the $10^{th}$ packet arrives first 8 bit counter should be equal to second 8 bit counter if the stream had RTP encapsulations. In another example embodiment, to account for limited packet reordering (e.g., caused due to out-of-order arrival of VoIP packets), a condition such as counter-1 *0.75 is equal to counter-2 can be used.

In accordance with the above-described procedure, the RTP detection engine 250 has three states for each flow of IP packet. The first state is the initialization state and RTP detection engine 250 enters this state when the IP packet for the flow is seen for the first time. As mentioned above, the generated statistical parameters are initialized in the first state. The second state is the detection state and the RTP detection engine 250 enters and stays in this state during the detection period. The detection period is for the predetermined number of IP packets, and in this state the statistical parameters are updated for each received IP packet of the flow. The final state is the result state and the RTP detection engine 250 enters this state after concluding whether the flow has RTP encapsulated data or not. The RTP detection engine 250 stays in this final state as long as the flow exists. Once the flow ceases, the entry corresponding to the flow is removed from the flow hash table.

Figure 3:
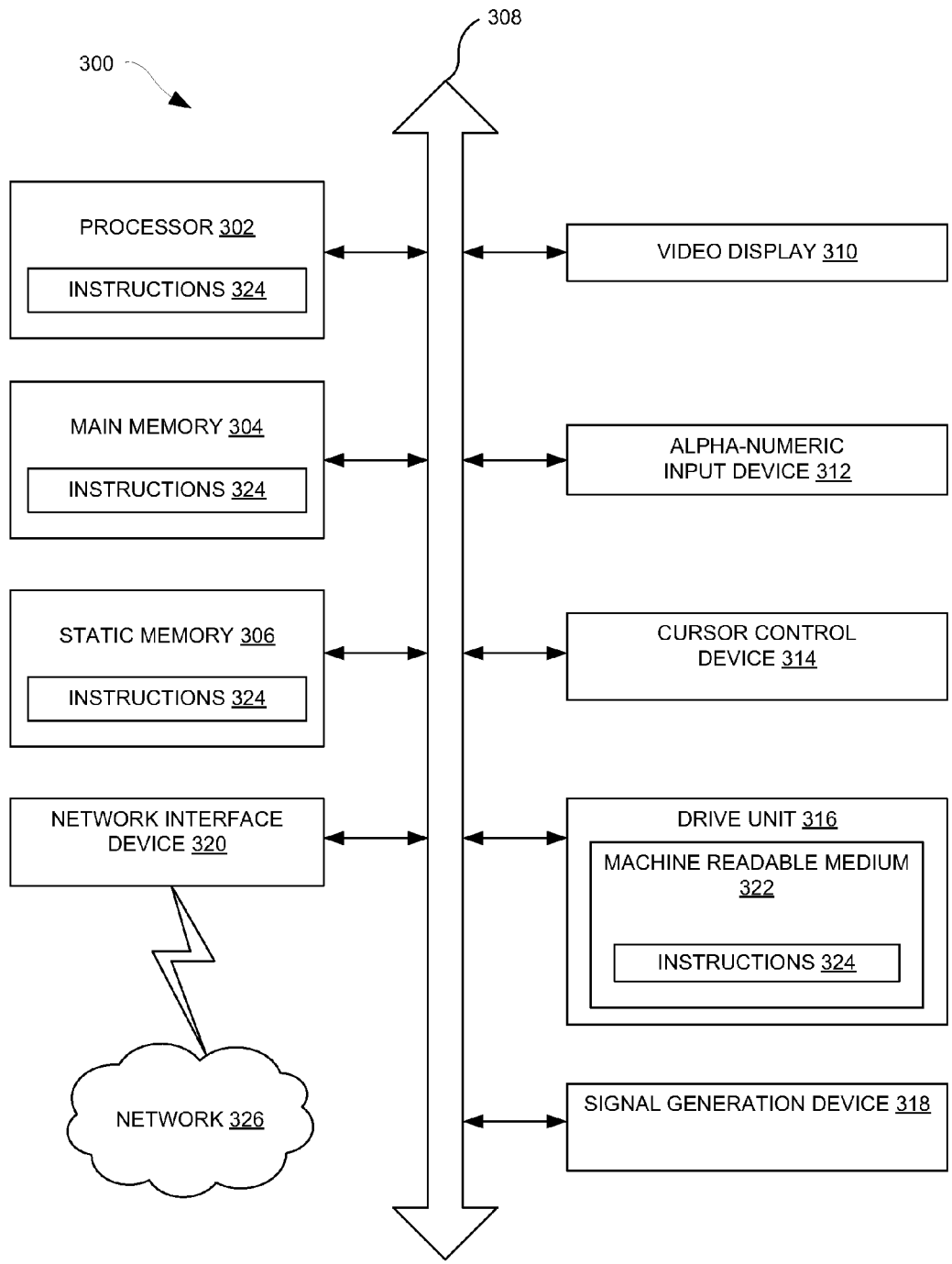
FIG. 3 is a diagrammatic system view of a data processing system in which any of the embodiments disclosed herein may be performed, according to one embodiment.

FIG. 3 is a diagrammatic system view 300 of a data processing system in which any of the embodiments disclosed herein may be performed, according to one embodiment. Particularly, the diagrammatic system view of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324 and a network 326, according to one embodiment.

The diagrammatic system view 300 may indicate a personal computer and/or a data processing system in which one or more operations disclosed herein are performed. The processor 302 may be a microprocessor, a state machine, an application specific integrated circuit, a field programmable gate array, etc. (e.g., Intel® Pentium® processor). The main memory 304 may be a dynamic random access memory and/ or a primary memory of a computer system. The static memory 306 may be a hard drive, a flash drive, and/or other memory information associated with the data processing system.

The bus 308 may be an interconnection between various circuits and/or structures of the data processing system. The video display 310 may provide graphical representation of information on the data processing system. The alpha-numeric input device 312 may be a keypad, keyboard and/or any other input device of text (e.g., a special device to aid the physically handicapped). The cursor control device 314 may be a pointing device such as a mouse. The drive unit 316 may be a hard drive, a storage system, and/or other longer term storage subsystem.

The signal generation device 318 may be a bios and/or a functional operating system of the data processing system. The network interface device 320 may perform interface functions (e.g., code conversion, protocol conversion, and/or buffering) required for communications to and from the network 326 between a number of independent devices (e.g., of varying protocols). The machine readable medium 322 may provide instructions on which of the methods disclosed herein may be performed. The instructions 324 may provide source code and/or data code to the processor 302 to enable any one or more operations disclosed herein.

For example, a storage medium having instructions, that when executed by a computing platform executes a method of identifying RTP based traffic in routers and switches in an IP network, includes receiving IP packets including a UDP header and a second header located substantially after the UDP header, generating statistical parameters by inspecting predetermined sequence of bits at predetermined offsets in the second header of each received IP packet for a predetermined number of IP packets, and determining whether the IP packet is an RTP based IP packet by comparing the generated statistical parameters to predetermined characteristics.

The storage medium may have instructions to pre-filter the received IP packets to allow only the IP packets comprising the UDP header and the second header to reach the RTP detection engine 250.

The storage medium may have instructions to compute a flow hash key using source IP address, destination IP address, source port and destination port information present in the UDP header of each IP packet, to determine whether each received IP packet belongs to a new flow using the flow hash key, and if the IP packet belongs to a new flow, enabling the new flow of each IP packet in a new flow hash table by updating a corresponding flow hash table using the generated statistical parameters associated with each IP packet and initiating a state machine for the new flow.

In these embodiments, enabling the new flow of each IP packet in the new flow hash table includes filling an 8 bit field with a content present in a 2nd byte following the UDP header, filling a 16 bit field with 16 bits at an offset of 2 bytes following the UDP header, and filling two 32 bits fields with a 2nd word and a 3rd word, respectively, following the UDP header.

The storage medium may also have instructions to declare that the IP packet belongs to an old flow and updating the associated state machine if the IP packet does not belongs to a new flow. In some embodiments, generating the statistical parameters by inspecting the predetermined sequence of bits at predetermined offsets in the second header of each IP packet, includes incrementing a corresponding first 8 bit counter if the IP packet belongs to the old flow, incrementing a corresponding second 8 bit counter, if a second byte following the UDP header substantially matches with the 8 bit field, if the 16 bits at an offset of 2 bytes from the UDP header is greater than a value present in the 16 bit field, if the second word following the UDP header is greater than the value contained in the first 32 bit field, and if the third word following the UDP header is equal to the second 32 bit field, and repeating the steps of incrementing the corresponding first 8 bit counter and incrementing the corresponding second 8 bit counter for the predetermined number of IP packets.

Furthermore, a computer system includes a processing unit and a memory coupled to the processor. The memory has code stored therein for identifying RTP based traffic in routers and switches in an IP network. The code causes the processor to receive IP packets comprising a UDP header and a second header located substantially after the UDP header, generate statistical parameters by inspecting predetermined sequence of bits at predetermined offsets in the second header of each received IP packet for a predetermined number of IP packets, and determine whether the IP packet is an RTP based IP packet by comparing the generated statistical parameters to predetermined characteristics.

The above-described technique to detect RTP packets relies on hardware based filtering and correlation analysis.

The above RTP based identification of multimedia streams can be used for applications, such as
- adding diff-serv code point values based on detection of RTP sessions
- applying ACLs on streams detected as RTP sessions
- selectively dropping IP packets with differing CDRC field based on bandwidth requirements (typically, when IP packets traverse a wired-wireless boundary)
- billing based on amount of RTP based streams transmitted (standard VoIP flows are RTP based)
- adding MPLS and Q-in-Q tags based on the presence of RTP data and hence providing fine grained content-based switching/routing.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of identifying RTP based traffic in routers and switches, comprising:
   receiving IP packets comprising a UDP header and a second header located substantially after the UDP header;
   generating statistical parameters by inspecting predetermined sequence of bits at predetermined offsets in the second header of each received IP packet for a predetermined number of IP packets; and
   determining whether the IP packet is an RTP based IP packet by comparing the generated statistical parameters to predetermined characteristics.

2. The method of claim 1, further comprising:
   pre-filtering the received IP packets to allow only the IP packets comprising the UDP header and the second header to reach an RTP detection engine.

3. The method of claim 1, further comprising:
   computing a flow hash key using source IP address, destination IP address, source port and destination port information present in the UDP header of each IP packet;
   determining whether each received IP packet belongs to a new flow using the flow hash key;
   if so, enabling the new flow of each IP packet in a new flow hash table by updating a corresponding flow hash table using the generated statistical parameters associated with each IP packet and initiating a state machine for the new flow.

4. The method of claim 3, wherein enabling the new flow of each IP packet in the new flow hash table comprises:
   filling an 8 bit field with a content present in a 2nd byte following the UDP header;
   filling a 16 bit field with 16 bits at an offset of 2 bytes following the UDP header; and
   filling two 32 bit fields with a 2nd word and 3rd word, respectively, following the UDP header.

5. The method of claim 3, further comprising:
   if not, declaring that the IP packet belongs to an old flow and updating the associated state machine.

6. The method of claim 5, wherein the statistical parameters comprise using bit sequences associated with fields in RTP based IP packet selected from the group consisting of flow type, time sequence number, time stamp and SSRC in the second header of the received IP packet.

7. The method of claim 6, wherein generating the statistical parameters by inspecting the predetermined sequence of bits at predetermined offsets in the second header of each IP packet, comprises:
   incrementing a corresponding first 8 bit counter if the IP packet belongs to the old flow;
   incrementing a corresponding second 8 bit counter, if a second byte following the UDP header substantially matches with the 8 bit field, if the 16 bits at an offset of 2 bytes from the UDP header is greater than a value present in the 16 bit field, if the second word following the UDP header is greater than the value contained in the first 32 bit field, and if the third word following the UDP header is equal to the second 32 bit field; and
   repeating the steps of incrementing the corresponding first 8 bit counter and incrementing the corresponding second 8 bit counter for the predetermined number of IP packets.

8. The method of claim 7, wherein determining whether the IP packet is an RTP based IP packet by comparing the generated statistical parameters to predetermined characteristics, comprises:
   declaring the IP packet as an RTP based IP packet if the first 8 bit counter is substantially equal to the second 8 bit counter.

9. A non-transitory computer readable storage medium having instructions, that when executed by a computing platform, result in execution of a method of identifying real-time transfer protocol (RTP) based traffic in routers and switches, said comprising instructions comprising code to:
   receive IP packets comprising a UDP header and a second header located substantially after the UDP header;
   generate statistical parameters by inspecting predetermined sequence of bits at predetermined offsets in the second header of each received IP packet for a predetermined number of IP packets; and
   determine whether the IP packet is an RTP based IP packet by comparing the generated statistical parameters to predetermined characteristics.

10. The non-transitory computer readable storage medium of claim 9, said instructions further comprising code to:
    compute a flow hash key using source IP address, destination IP address, source port and destination port information present in the UDP header of each IP packet;
    determine whether each received IP packet belongs to a new flow using the flow hash key;
    if so, enable the new flow of each IP packet in a new flow hash table by updating a corresponding flow hash table using the generated statistical parameters associated with each IP packet and initiating a state machine for the new flow.

11. The non-transitory computer readable storage medium of claim 10, said instructions further comprising code to:
    if not, declare that the IP packet belongs to an old flow and updating the associated state machine.

12. A device for identifying real-time transfer protocol (RTP) based traffic, comprising:
    a memory storing machine readable instructions for:
    a UDP header parser for receiving that is to receive IP packets and parse the IP packets comprising a UDP header; and an RTP detection engine that is to generate statistical parameters through an inspection of a predetermined sequence of bits at predetermined offsets in a second header of each received IP packet comprising the UDP header for a predetermined number of IP packets, and wherein the RTP detection engine is to determine whether the IP packet is an RTP based IP packet through a comparison of the generated statistical parameters to predetermined characteristics; and a hardware processor to implement the machine readable instructions.

13. The device of claim 12, wherein the UDP header parser is to pre-filter the received IP packets to allow only the IP packets comprising the UDP header and the second header to reach the RTP detection engine.

14. The device of claim 12, wherein the memory further stores machine readable instructions for:

a hash engine that is to compute a flow hash key using source IP address, destination IP address, source port and destination port information present in the UDP header of each IP packet, wherein the RTP detection engine is to determine, using the flow hash key, whether each received IP packet belongs to a new flow; and a flow hash table buffer coupled to the hash engine, wherein the RTP detection engine enables the new flow of each IP packet in a new flow hash table through an update of a corresponding flow hash table entry residing in the flow hash table using the generated statistical parameters associated with each IP packet and is to initiate a state machine for the new flow if the received IP packet belongs to the new flow.

15. The device of claim 14, wherein the RTP detection engine is to fill an 8 bit field with a content present in a 2nd byte following the UDP header, wherein the RTP detection engine is to fill a 16 bit field with 16 bits at an offset of 2 bytes following the UDP header, and wherein the RTP detection engine is to fill two 32 bits fields with a 2nd word and 3rd word, respectively, following the UDP header to enable the new flow of each IP packet in the new flow hash table.

16. The device of claim 14, wherein the RTP detection engine is to declare that the IP packet belongs to an old flow and is to update the associated state machine if the received IP packet belongs to the old flow.

17. The device of claim 14, wherein generation of the statistical parameters comprises use of bit sequences associated with fields in the RTP based IP packet selected from the group consisting of flow type, time sequence number, time stamp and SSRC in the second header of the received IP packet.

18. The device of claim 14, wherein the RTP detection engine is to increment a corresponding first 8 bit counter if the IP packet belongs to the old flow, wherein the RTP detection engine is to increment a corresponding second 8 bit counter, if a second byte following the UDP header matches with the 8 bit field, if the 16 bits at an offset of 2 bytes from the UDP header is greater than a value present in the 16 bit field, if the second word following the UDP header is greater than the value contained in the first 32 bit field, and if the third word following the UDP header is equal to the second 32 bit field, and wherein the RTP detection engine is to repeat the incrementation of the corresponding first 8 bit counter and the incrementation of the corresponding second 8 bit counter for the predetermined number of IP packets.

19. The device of claim 18, wherein the RTP detection engine is to declare the IP packet as an RTP based IP packet if the first 8 bit counter is substantially equal to the second 8 bit counter.

* * * * *

UNITED STATES PATENT AND TRADEMARK OFFICE
CERTIFICATE OF CORRECTION

PATENT NO. : 8,306,015 B2
APPLICATION NO. : 12/195448
DATED : November 6, 2012
INVENTOR(S) : Ravindra Guntur It is certified that error appears in the above-identified patent and that said Letters Patent is hereby corrected as shown below:

In the Claims

In column 8, line 36, in Claim 9, after "said" delete "comprising".

In column 8, line 65, in Claim 12, after "parser" delete "for receiving".

Signed and Sealed this
Seventeenth Day of September, 2013

Teresa Stanek Rea
*Deputy Director of the United States Patent and Trademark Office*